United States Patent
Sagong

(10) Patent No.: US 12,476,587 B2
(45) Date of Patent: Nov. 18, 2025

(54) HYBRID SOLAR PANEL

(71) Applicant: KUKDONG ENERGY Corp, Gyeongsangbuk-do (KR)

(72) Inventor: Myeong Geon Sagong, Gyeongsangbuk-do (KR)

(73) Assignee: KUKDONG ENERGY Corp, Gyeongsangbuk-do (KR)

( * ) Notice: Subject to any disclaimer, the term of this patent is extended or adjusted under 35 U.S.C. 154(b) by 118 days.

(21) Appl. No.: 18/236,386

(22) Filed: Aug. 21, 2023

(65) Prior Publication Data

US 2025/0150030 A1    May 8, 2025

(30) Foreign Application Priority Data

Nov. 10, 2022 (KR) .................. 10-2022-0149636

(51) Int. Cl.
*H02S 40/44* (2014.01)
*F24S 10/70* (2018.01)
*H02S 40/20* (2014.01)

(52) U.S. Cl.
CPC .............. *H02S 40/44* (2014.12); *F24S 10/72* (2018.05); *H02S 40/20* (2014.12)

(58) Field of Classification Search
CPC ..... H02S 10/30; H02S 40/40–44; Y02E 10/60
See application file for complete search history.

(56) References Cited

U.S. PATENT DOCUMENTS

2016/0036378 A1*  2/2016 Gray .................. H02S 40/425
                                                                136/248

FOREIGN PATENT DOCUMENTS

KR      10-1770723 B1      8/2017
KR      20210133856 A   *  11/2021

OTHER PUBLICATIONS

KR-20210133856-A English (Year: 2021).*

* cited by examiner

*Primary Examiner* — Bach T Dinh
(74) *Attorney, Agent, or Firm* — Revolution IP, PLLC

(57) ABSTRACT

A hybrid solar panel includes a solar photovoltaic panel configured to generate electrical energy by receiving sunlight, a solar thermal panel formed on a lower portion of the solar photovoltaic panel, and a lattice-type refrigerant flow path which is formed inside the solar thermal panel and in which a horizontal guide unit is formed, the horizontal guide unit being configured to guide at least a portion of a refrigerant for cooling the solar photovoltaic panel by absorbing heat generated as sunlight irradiates the solar photovoltaic panel to a horizontal direction.

6 Claims, 3 Drawing Sheets

[Fig 1]
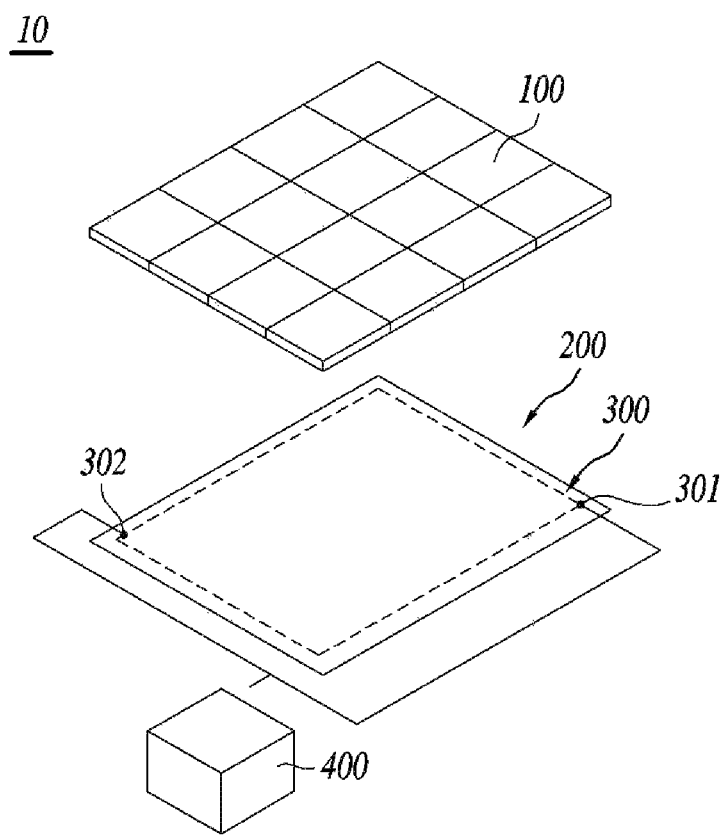

[Fig 2]
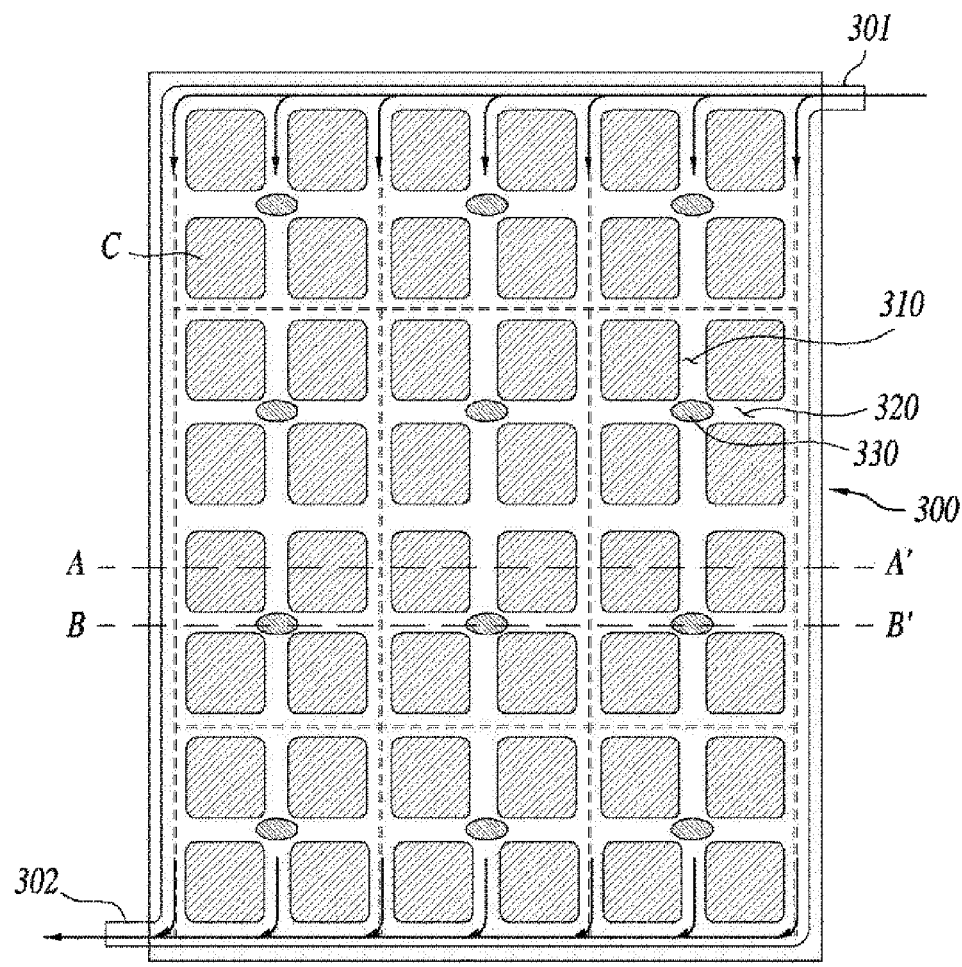
[Fig 3]
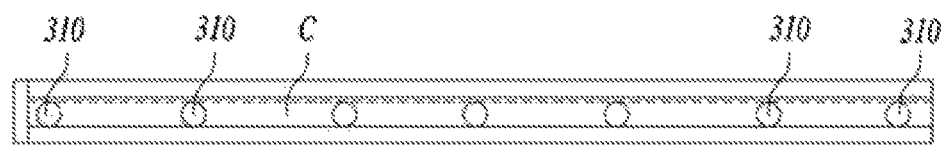

[Fig 4]
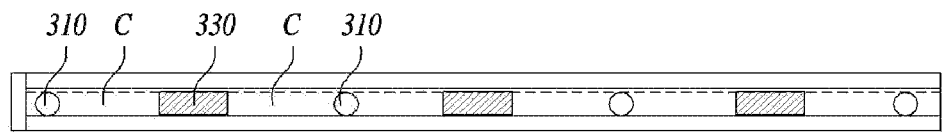
[Fig 5]
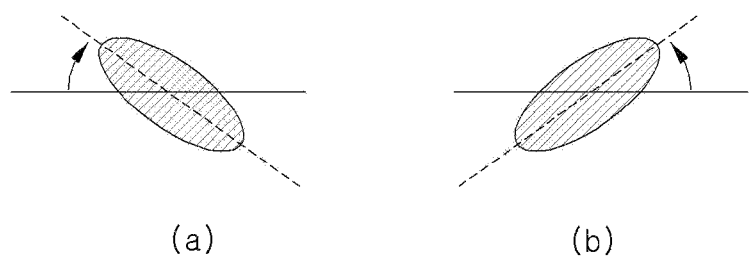
(a)  (b)

HYBRID SOLAR PANEL

CROSS REFERENCE TO RELATED APPLICATION

The present application claims priority to Korean Patent Application No. 10-2022-0149636, filed Nov. 10, 2022, the entire contents of which are incorporated herein for all purposes by this reference.

BACKGROUND OF THE INVENTION

Field of the Invention

The present disclosure relates to a hybrid solar panel capable of increasing electric power generation efficiency by cooling a solar photovoltaic panel while heat generated as sunlight irradiates the solar photovoltaic panel is absorbed.

Description of the Related Art

Recently, due to problems of depletion of fossil energy and environmental pollution, a lot of attention has been focused around the world on power generation using alternative energy. Particularly, various eco-friendly energies such as solar photovoltaic power generation, wind power generation, and fuel cells are attracting attention.

Among the various eco-friendly energies, solar photovoltaic power generation is a technology of converting sunlight directly into electrical energy, and refers to a power generation method using solar cells that generate electricity by photoelectric effect when the solar cells receive sunlight. Such a solar photovoltaic power generation device includes a module including a solar cell (a solar battery), and includes a storage battery and an electric power conversion device.

Such a solar cell is a photoelectric cell manufactured for the purpose of converting solar energy into electrical energy, and utilizes a photo-electromotive force generated by the photoelectric effect caused when light irradiates a contact surface between metal and a semiconductor or a PN junction of a semiconductor. That is, when light from outside is incident on a solar photovoltaic module, an electron in a conduction band of a P-type semiconductor is excited into a valence band by incident light energy, the excited electron forms an electron-hole pair (EHP) inside the P-type semiconductor, and the electron in the EHP generated in this manner is transferred to an N-type semiconductor by an electric field existing between the PN junction and supplies electricity to the outside.

Globally, solar photovoltaic power generation is currently being developed and operated up to the 3,000 kW class, and is continuously being researched so as to improve efficiency and to realize large capacity for practical use. In solar photovoltaic power generation, there are advantages that the energy source is clean and unlimited, a required amount of power at a required location is capable of being generated, maintenance is easily performed, and unmanned operation is capable of being performed. However, unlike other thermal power generation or nuclear power generation, there is a disadvantage that solar photovoltaic power generation requires a large installation area due to low energy density.

In addition, most of the power generation efficiency of solar photovoltaic power generation is 21% to 22%, and there is a problem that the power generation efficiency decreases by 0.39% to 0.40% per 1 degree Celsius increase when the temperature of the solar photovoltaic panel is increased by receiving the solar heat.

Document of Related Art (Patent Document 1) Korean Patent No. 10-1770723 (title of the invention: APPARATUS FOR SOLAR ENERGY GENERATION)

SUMMARY OF THE INVENTION

Accordingly, the present disclosure has been made keeping in mind the above problems occurring in the related art, and an objective of the present disclosure is to provide a hybrid solar panel capable of increasing electric power generation efficiency by cooling a solar photovoltaic panel while heat generated as sunlight irradiates the solar photovoltaic panel is absorbed.

According to an embodiment of the present disclosure, there is provided a hybrid solar panel including: a solar photovoltaic panel configured to generate electrical energy by receiving sunlight; a solar thermal panel formed on a lower portion of the solar photovoltaic panel; and a lattice-type refrigerant flow path which is formed inside the solar thermal panel and in which a horizontal guide unit is formed, the horizontal guide unit being configured to guide at least a portion of a refrigerant for cooling the solar photovoltaic panel by absorbing heat generated as sunlight irradiates the solar photovoltaic panel to a horizontal direction.

In the hybrid solar panel according to an embodiment of the present disclosure, the lattice-type refrigerant flow path may be formed by connecting a plurality of metal pipes to each other such that a plurality of longitudinal flow paths and a plurality of transverse flow paths are formed and a lattice shape is formed.

In the hybrid solar panel according to an embodiment of the present disclosure, flow cross-sectional areas of the longitudinal flow paths may be smaller than flow cross-sectional areas of the transverse flow paths.

In the hybrid solar panel according to an embodiment of the present disclosure, the horizontal guide unit may include a protrusion unit that protrudes upward or downward from at least one of a lower surface and an upper surface inside the transverse flow paths.

In the hybrid solar panel according to an embodiment of the present disclosure, the horizontal guide unit may include a protrusion unit formed in a column shape connecting a lower surface and an upper surface inside the transverse flow paths.

In the hybrid solar panel according to an embodiment of the present disclosure, the protrusion unit may be formed at each point where the longitudinal flow paths and the transverse flow paths intersect with each other.

In the hybrid solar panel according to an embodiment of the present disclosure, the protrusion unit may be formed in an elliptical column shape having a semi major axis in a transverse direction of the transverse flow paths.

Other details of implementations according to various aspects of the present disclosure are included in the detailed description below.

According to an embodiment of the present disclosure, heat generated as sunlight irradiates the solar photovoltaic panel is absorbed, so that the solar photovoltaic panel is cooled, thereby being capable of increasing the power generation efficiency. Particularly, the horizontal guide unit guides the refrigerant toward the center region of the solar photovoltaic panel where heat is mainly generated, thereby being capable of increasing the heat absorption time of the refrigerant and increasing the cooling efficiency.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a hybrid solar panel according to an embodiment of the present disclosure;

FIG. 2 is a plan view illustrating a solar thermal panel;

FIG. 3 is a cross-sectional view taken along line A-A' in FIG. 2;

FIG. 4 is a cross-sectional view taken along line B-B' in FIG. 2; and

FIG. 5 shows plan views (A) and (B) illustrating an application example of a shape of a horizontal guide unit according to an arrangement position.

DETAILED DESCRIPTION OF THE INVENTION

The present disclosure may be variously modified and may have various embodiments, and specific embodiments will now be described in detail. However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure.

The terminology used herein is for the purpose of describing specific embodiments only and is not intended to limit the present disclosure. Singular expressions include plural expressions unless the context clearly indicates otherwise. It is to be understood that terms such as 'including', 'having', and so on are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added. Hereinafter, a hybrid solar panel according to an embodiment of the present disclosure will be described with reference to drawings.

FIG. 1 is a perspective view illustrating a hybrid solar panel according to an embodiment of the present disclosure. As illustrated in FIG. 1, a hybrid solar panel 10 according to an embodiment of the present disclosure includes a solar photovoltaic panel 100, a solar thermal panel 200, and a lattice-type refrigerant flow path 300. The lattice-type refrigerant flow path 300 is mounted inside the solar thermal panel 200.

The solar photovoltaic panel 100 is a device configured to receive sunlight and to convert solar photovoltaic energy into electrical energy. Generally, the solar photovoltaic panel 100 is formed in a rectangular plate shape, has a plurality of solar photovoltaic cells disposed therein, and may be mounted slantly by a separate frame so as to efficiently receive sunlight. The solar photovoltaic panel 100 may be configured as an aggregate of the solar photovoltaic cells that are a plurality of unit cells. In addition, the solar photovoltaic cell generally generates a voltage of 0.5 V to 0.6 V, i.e., an electric power of approximately 3 W to 4 W. In addition, the solar photovoltaic panel 100 including the plurality of unit solar photovoltaic cells generally has an output of approximately 16 V to 26 V, and approximately 120 W to 300 W.

The solar photovoltaic panel 100 may include a silicon solar cell panel, a dye-sensitized solar cell panel, a compound semiconductor solar cell panel, and a solar cell in a tandem-type solar photovoltaic panel. In addition, the solar photovoltaic panel 100 may include a tab line electrically connecting the plurality of solar cells to each other, glass positioned at an upper portion of the solar cell and configured to protect a component that is positioned inside the glass, a rear surface sheet positioned at a lower portion of the solar cell and configured to support a component that is positioned inside the rear surface sheet, and a bonding material supporting the solar cells, the glass, and the rear surface sheet, but there is no limitation. A detailed configuration of the solar photovoltaic panel 100 is a general configuration, so a detailed description thereof is omitted.

The solar thermal panel 200 is formed in a plate shape, is attached to a lower surface of the solar photovoltaic panel 100, and includes the lattice-type refrigerant flow path 300 in which a refrigerant for cooling the solar photovoltaic panel 100 flows, the refrigerant absorbing heat generated as sunlight irradiates the solar photovoltaic panel 100.

The lattice-type refrigerant flow path 300 is mounted in the solar thermal panel 200, may include an inlet port 301 into which the refrigerant is introduced, and may include an outlet port 302 to which the refrigerant is discharged. The temperature of the refrigerant introduced through the inlet port 301 may be increased while flowing along the lattice-type refrigerant flow path 300, and the refrigerant in which the temperature thereof is increased may be discharged through the outlet port 302.

The solar thermal panel 200 is in contact with a lower portion of the solar photovoltaic panel 100, and absorbs thermal energy generated as the solar photovoltaic panel 100 is heated, thereby being capable of heating the refrigerant flowing in the lattice-type refrigerant flow path 300 formed within the solar thermal panel 200.

At this time, the refrigerant is a Freon gas-based refrigerant, and may be R-134A or R-407C, but is not limited thereto. Such a Freon gas-based refrigerant does not freeze at 40 degrees Celsius below zero and does not boil at equal to or more than 100 degrees Celsius, so that frost is generated around a Freon gas-based refrigerant flow path even in summer.

Therefore, the Freon gas-based refrigerant has an effect of effectively cooling the solar photovoltaic panel 100 even in the summer season. In addition, it is preferable that the solar thermal panel 200 is manufactured from a material that has a high thermal transfer efficiency in order to efficiently transfer heat.

The hybrid solar panel 10 may further include a heat pump 400 configured to heat water by using the refrigerant that is heated by heat transferred from the solar photovoltaic panel 100. In addition, the heat pump 400 may include a compressor configured to compress the refrigerant flowing in the lattice-type refrigerant flow path 300, a refrigerant tank in which the refrigerant supplied to the lattice-type refrigerant flow path 300 is stored, a dry filter configured to remove moisture of the refrigerant, and an electronic expansion valve configured to supply the refrigerant to the lattice-type refrigerant flow path 300. Such a configuration is a general configuration used in the technical field of a refrigerant conduit heat collecting plate, so that a detailed description thereof is omitted.

Next, referring to FIG. 2 to FIG. 4, the solar thermal panel 200 and the lattice-type refrigerant flow path 300 are described in detail. FIG. 2 is a plan view illustrating the solar thermal panel, FIG. 3 is a cross-sectional view taken along line A-A' in FIG. 2, and FIG. 4 is a cross-sectional view taken along line B-B' in FIG. 2.

Referring to FIG. 2, the lattice-type refrigerant flow path 300 is formed in the solar thermal panel 200. The lattice-type refrigerant flow path 300 may be formed by connecting a plurality of metal pipes to each other such that a plurality of longitudinal flow paths 310 and a plurality of transverse flow paths 320 are formed and a lattice shape is formed. In FIG. 2, the lattice-type refrigerant flow path 300 including seven longitudinal flow paths 310 and nine transverse flow paths 320 is illustrated, but the number of the longitudinal flow paths 310 and the number of the transverse flow paths 320 are not limited thereto. The metal pipes constituting the longitudinal flow path 310 and the transverse flow path 320 are provided with a material having excellent thermal conductivity.

A thermal paste is applied to a surface where the metal pipes are in contact with the solar photovoltaic cells that constitute the solar photovoltaic panel 100, thereby improving adhesiveness of the solar photovoltaic cells and the thermal conductivity of the solar photovoltaic cells with the lattice-type refrigerant flow path 300. In addition, an insulating material is at least partially formed on side surfaces and a lower surface of the lattice-type refrigerant flow path 300, thereby preventing heat absorbed by the refrigerant from being discharged to the outside.

In the longitudinal flow path 310 and the transverse flow path 320 constituting the lattice-type refrigerant flow path 300, a flow cross-sectional area of the longitudinal flow path 310 is smaller than a flow cross-sectional area of the transverse flow path 320, so that a flow velocity of the transverse flow path 320 is slower than a flow velocity of the longitudinal flow path 310, thereby increasing a heat absorption time of the refrigerant flowing in the transverse flow path 320 such that a cooling efficiency is increased. Reference numeral C indicates the insulating material that is disposed on a region formed by the longitudinal flow path 310 and the transverse flow path 320.

Meanwhile, in the solar photovoltaic panel 100, heat is generated mainly in a center region of the solar photovoltaic panel 100. Therefore, in the present disclosure, the lattice-type refrigerant flow path 300 includes a horizontal guide unit 330 configured to guide the refrigerant flowing in the longitudinal flow path 310 to a horizontal direction (a transverse direction) so that at least a portion of the refrigerant is concentrated to the center region of the solar photovoltaic panel 100.

The horizontal guide unit 330 may include a protrusion unit that protrudes upward by a predetermined height from a lower surface inside the transverse flow path 320, or may include a protrusion unit that protrudes downward by a predetermined depth from an upper surface inside the transverse flow path 320. Alternatively, the horizontal guide unit 330 may include a protrusion unit formed in a column shape that connects the lower surface and the upper surface inside the transverse flow path 320 to each other. At this time, it is preferable that the horizontal guide unit 330 is formed at a point where the longitudinal flow path 310 and the transverse flow path 320 intersect with each other.

The horizontal guide unit 330 is formed as a structure that protrudes in a height direction (or up and down directions) of the transverse flow path 320 at a point where the longitudinal flow path 310 and the transverse flow path 320 intersect with each other, and a portion of the refrigerant flowing in the longitudinal flow path 310 collides with a surface of the horizontal guide unit 320 and flows toward the transverse flow path 320. At this time, in order to guide the refrigerant in the longitudinal flow path 310 toward the transverse flow path 320, it is preferable that the horizontal guide unit 330 is formed in an elliptical column shape having a semi major axis in the transverse direction. As the horizontal guide unit 330 is formed in the elliptical column shape having the semi major axis in the transverse direction, the area in which the refrigerant is in contact with the horizontal guide unit 330 may be maximized, and the cooling efficiency may be increased and also the heat absorption time of the refrigerant may be increased while a portion of the refrigerant flowing in the longitudinal flow path 310 is guided toward the transverse flow path 320.

FIGS. 5A and 5B are plan views illustrating an application example of a shape of a horizontal guide unit according to an arrangement position. Referring to FIG. 2 and FIG. 4, the horizontal guide unit 330 is configured to guide a portion of the refrigerant flowing in the longitudinal flow path 310 toward the transverse flow path 320 so that the portion of the refrigerant is concentrated to the center region of the solar photovoltaic panel 100, but a portion of the refrigerant may be guided toward an outer side of the transverse flow path 320 in directions (directions toward both ends of the transverse flow path 320) opposite to the center region of the solar photovoltaic panel 100. In order to prevent this situation, as illustrated in FIGS. 5A and 5B, the shape of the horizontal guide unit 330 may be changed according to an arrangement position.

For example, as illustrated in FIG. 5A, when the horizontal guide unit 330 is disposed in a position in a first side end portion direction (a left side end portion direction in FIG. 2) from the center of the transverse flow path 320, the horizontal guide unit 330 may be mounted such that the semi major axis of an ellipse of the horizontal guide unit 330 is rotated by a predetermined angle from a horizontal angle to a first direction (a clockwise direction).

Similarly, as illustrated in FIG. 5B, when the horizontal guide unit 330 is disposed in a position in a second side end portion direction (a right side end portion direction in FIG. 2) from the center of the transverse flow path 320, the horizontal guide unit 330 may be mounted such that the semi major axis of the ellipse of the horizontal guide unit 330 is rotated by a predetermined angle from the horizontal angle to a second direction (a counterclockwise direction).

That is, when the horizontal guide unit 330 is slantly disposed toward one side with respect to the center of the solar photovoltaic panel 100, the semi major axis of the ellipse is rotated and disposed such that a contact surface of the ellipse is oriented toward the center of the solar photovoltaic panel 100, so that a large amount of the refrigerant is prevented from being guided to the outer side of the transverse flow path 320. Of course, in any case, at least a portion of the refrigerant will be guided to the outer side of the transverse flow path 320 and the corresponding region will be cooled, but the amount of the refrigerant may be adjusted according to a rotation angle of the semi major axis of the horizontal guide unit 330.

According to the hybrid solar panel according to an embodiment of the present disclosure, the solar photovoltaic panel is cooled while heat generated as sunlight irradiates the solar photovoltaic panel is absorbed, so that power generation efficiency may be increased. Particularly, the horizontal guide unit guides the refrigerant toward the center region of the solar photovoltaic panel where heat is mainly generated, thereby being capable of increasing the heat absorption time of the refrigerant and increasing the cooling efficiency.

While an embodiment of the present disclosure has been described with reference to the accompanying drawings, it will be apparent to those skilled in the art that various modifications and variations can be made through addition, change, omission, or substitution of components without departing from the spirit and scope of the disclosure as set forth in the appended claims, and these modifications and changes fall within the spirit and scope of the present disclosure as defined in the appended claims.

What is claimed is:

1. A hybrid solar panel comprising:
   a solar photovoltaic panel configured to generate electrical energy by receiving sunlight;
   a solar thermal panel formed on a lower portion of the solar photovoltaic panel; and
   a lattice-type refrigerant flow path which is formed inside the solar thermal panel and in which a horizontal guide unit is formed, the horizontal guide unit being configured to guide at least a portion of a refrigerant for cooling the solar photovoltaic panel by absorbing heat generated as sunlight irradiates the solar photovoltaic panel to a horizontal direction,
   wherein the lattice-type refrigerant flow path is formed by connecting a plurality of metal pipes to each other such that a plurality of longitudinal flow paths and a plurality of transverse flow paths are formed and a lattice shape is formed,
   wherein the horizontal guide unit comprises a protrusion unit that protrudes upward or downward from at least one of a lower surface and an upper surface inside the transverse flow paths, and
   wherein the protrusion unit is formed at each point where the longitudinal flow paths and the transverse flow paths intersect with each other.

2. The hybrid solar panel of claim 1, wherein flow cross-sectional areas of the longitudinal flow paths are smaller than flow cross-sectional areas of the transverse flow paths.

3. The hybrid solar panel of claim 1, wherein the horizontal guide unit comprises a protrusion unit formed in a column shape connecting a lower surface and an upper surface inside the transverse flow paths.

4. A hybrid solar panel comprising:
   a solar photovoltaic panel configured to generate electrical energy by receiving sunlight;
   a solar thermal panel formed on a lower portion of the solar photovoltaic panel; and
   a lattice-type refrigerant flow path which is formed inside the solar thermal panel and in which a horizontal guide unit is formed, the horizontal guide unit being configured to guide at least a portion of a refrigerant for cooling the solar photovoltaic panel by absorbing heat generated as sunlight irradiates the solar photovoltaic panel to a horizontal direction,
   wherein the lattice-type refrigerant flow path is formed by connecting a plurality of metal pipes to each other such that a plurality of longitudinal flow paths and a plurality of transverse flow paths are formed and a lattice shape is formed,
   wherein the horizontal guide unit comprises a protrusion unit formed in a column shape connecting a lower surface and an upper surface inside the transverse flow paths, and
   wherein the protrusion unit is formed at each point where the longitudinal flow paths and the transverse flow paths intersect with each other.

5. The hybrid solar panel of claim 1, wherein the protrusion unit is formed in an elliptical column shape having a semi major axis in a transverse direction of the transverse flow paths.

6. The hybrid solar panel of claim 4, wherein the protrusion unit is formed in an elliptical column shape having a semi major axis in a transverse direction of the transverse flow paths.

* * * * *